United States Patent
Barton et al.

(10) Patent No.: US 12,301,430 B2
(45) Date of Patent: May 13, 2025

(54) HIDDEN-LAYER ROUTING FOR DISAGGREGATED ARTIFICIAL NEURAL NETWORKS

(71) Applicant: Cisco Technology, Inc., San Jose, CA (US)

(72) Inventors: Robert Edgar Barton, Richmond (CA); Frank Brockners, Cologne (DE); Jerome Henry, Pittsboro, NC (US); Matthias Falkner, Ottawa (CA); Indermeet Singh Gandhi, San Jose, CA (US); Thomas Michel-Ange Feltin, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/477,476

(22) Filed: Sep. 28, 2023

(65) Prior Publication Data

US 2025/0112832 A1    Apr. 3, 2025

(51) Int. Cl.
| | | |
|---|---|---|
| *H04L 41/16* | (2022.01) | |
| *H04L 45/74* | (2022.01) | |
| *H04L 67/1008* | (2022.01) | |

(52) U.S. Cl.
CPC ............ *H04L 41/16* (2013.01); *H04L 45/74* (2013.01); *H04L 67/1008* (2013.01)

(58) Field of Classification Search
CPC ...... H04L 41/16; H04L 45/74; H04L 67/1008
See application file for complete search history.

(56) References Cited

U.S. PATENT DOCUMENTS

| | | | |
|---|---|---|---|
| 2017/0237656 A1* | 8/2017 | Gage | H04L 61/2521 370/392 |
| 2019/0005384 A1 | 1/2019 | Sundar et al. | |
| 2019/0123974 A1* | 4/2019 | Georgios | G06N 3/084 |
| 2019/0156211 A1 | 5/2019 | Dong et al. | |

(Continued)

OTHER PUBLICATIONS

Manso, et al., "Scalability Analysis of Machine Learning QoT Estimators for a Cloud-Native SDN Controller on a WDM Over SDM Network," Journal of Optical Communications and Networking, vol. 14, No. 4, 2022, pp. 257-266.

(Continued)

*Primary Examiner* — David R Lazaro
*Assistant Examiner* — Mariegeorges A Henry
(74) *Attorney, Agent, or Firm* — Lee & Hayes, P.C.

(57) ABSTRACT

Novel techniques and mechanisms enable processing of heavy deep learning workloads on standard edge network devices to optimize the overall inference throughput of the network while meeting Service Level Agreement(s) (SLAs). The techniques can include receiving a deep learning model, determining a graph structure of the deep learning model including neurons organized in layers (the layers including an input layer, a plurality of hidden layers, and an output layer), assigning to a first IP subnet, at least a part of a first hidden layer of the plurality of hidden layers, assigning to a second IP subnet, at least a part of a second hidden layer of the plurality of hidden layers, and deploying the parts of the first and second hidden layers to edge devices as containerized applications with assigned IP addresses, which may be hidden from the user and/or third party application.

20 Claims, 5 Drawing Sheets

(56) References Cited

U.S. PATENT DOCUMENTS

| | | | |
|---|---|---|---|
| 2019/0349287 A1* | 11/2019 | Chandra Sekar Rao | ................... H04L 47/125 |
| 2019/0378013 A1 | 12/2019 | Wu et al. | |
| 2021/0386389 A1* | 12/2021 | Freiman | ................... G06N 3/08 |
| 2022/0237467 A1* | 7/2022 | Ravishankar | .......... G06N 3/088 |
| 2022/0311678 A1* | 9/2022 | Karjee | ................. G06N 3/0464 |
| 2022/0329511 A1* | 10/2022 | Woodworth | ...... G06F 18/23213 |
| 2022/0345483 A1* | 10/2022 | Shua | ................... G06F 9/45558 |
| 2023/0053575 A1 | 2/2023 | Marche et al. | |
| 2023/0068386 A1* | 3/2023 | Akdeniz | ................ G06N 3/084 |
| 2023/0104612 A1 | 4/2023 | Cella et al. | |
| 2023/0117143 A1* | 4/2023 | Yehezkel Rohekar | .. G06N 7/01 706/25 |
| 2023/0342601 A1* | 10/2023 | Mavroeidis | ............ G06N 20/00 |
| 2024/0029084 A1* | 1/2024 | Douville | ............ G06Q 30/0201 |

OTHER PUBLICATIONS

Shuvo, et al., "Efficient Acceleration of Deep Learning Inference on Resource-Constrained Edge Devices: A Review", Proceedings of the IEEE, vol. 111, No. 1, Jan. 1, 2023, pp. 42-91.

Search Report and Written Opinion for International Application No. PCT/US2024/048686, Dated Feb. 5, 2025, 14 pages.

Weiwen, et al., "A trajectory Prediction-Based and Dependency-Aware Container Migration for Mobile Edge Computing", IEEE Transactions on Services Computing, vol. 16, No. 5, Jun. 26, 2023, pp. 3168-3181.

\* cited by examiner

HIDDEN-LAYER ROUTING FOR DISAGGREGATED ARTIFICIAL NEURAL NETWORKS

TECHNICAL FIELD

The present disclosure relates generally to the field of computer networking, and more particularly to enabling dynamic partitioning and distribution of hidden layers of a deep-learning model to resource-constrained devices, e.g., edge device(s) in a network according to IP routing to implement a disaggregated artificial neural network that can efficiently perform radio resource management (RRM) in a systems context.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of network architectures, such as Local-Area Networks (LANs) that are in one physical location such as a building, Wide-Area Networks (WANs) that extend over a large geographic area to connect devices associated with individual users or LANs, Enterprise Networks that are built for a large organization, Internet Service Provider (ISP) Networks that operate WANs to provide connectivity to devices associated with individual users or enterprises, software-defined networks (SDNs), wireless networks, core networks, cloud networks, and so forth.

These networks often include specialized network devices to communicate packets representing various data from device-to-device, such as switches, routers, servers, access points, etc. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further from each other.

In recent years, a rapidly growing number of new applications integrate a cloud-offloaded processing. Traditionally, "cloud" refers to remote cloud, a cloud placed in a datacenter and connected to the devices associated with individual users through the core infrastructure of the internet. One advantage of remote clouds is their near-infinite compute-power capacity. Accordingly, cloud-offloaded applications are differentiated from classical standalone applications by the fact that a part of their processing is done remotely in a cloud. However, the location of remote clouds is usually far from the devices associated with individual users. In addition, the data-sources and access paths of the cloud are also out of control for the user. Moreover, cloud offloading may cause high latency, high jitter, high error rate, low available bandwidth, intermittent connectivity, GRPD and legal issues that are incompatible with some emerging applications (e.g., remote medical surgery, offloaded automated driving or real-time detection). Further, when artificial intelligence applications that process real-time streaming data at the edge are presented with strict service level agreements (SLAs) or privacy restrictions, deployment in the cloud can become difficult.

One proposed solution is edge offloading. The idea is to use multiple machines deployed at the edges of a network which can run part of the application components. These edge devices (e.g., sensors, microphones, cameras, user generated data, etc.) can be located close to sensors or devices associated with individual users (for example, some cameras have an integrated Tensors Processing Unit (TPU) to run detection neural networks directly after the sensor) or can be located further away (e.g., on the same LAN or the same access network (in cases of mobile networks for example)). Currently, most deep learning applications that run on edge devices are composed of a monolithic pre-trained Deep Neural Network (DNN) which runs inference on data generated at the edge devices. However, most DNNs are often too heavy to run on the edge devices, such that a vast majority of deep learning-based applications are run on remote clouds. In the case of real-time or latency-sensitive applications, or in cases where policy compliance forbids data from leaving the edge devices, offloading inference to the remote cloud is not an option.

Another use case for edge offloading is in Wi-Fi™ networks that use radio resource management (RRM) to optimize the radio frequency (RF) conditions of a wireless LAN and to root cause analyze (RCA) wireless problems. Typically, RRM is performed in or near the wireless LAN controller, and older implementations were strictly threshold-based approximation schemes or use artificial neural networks (ANN) to predict the best channel/power set for all access points. To perform RRM conventionally requires devices supporting deep learning (DL); however, edge devices generally lack a Graphics-Processing Unit (GPU), which have been required to employ DL.

Thus, in resource constrained networks, users (e.g., such as developers) wanting reasonable performance for heavy deep learning workloads often need to choose between buying hardware acceleration equipment or downsizing their neural networks. However, buying additional hardware acceleration equipment (GPUs, TPUs, etc.), is expensive. Further, downsizing the neural network also requires extended development efforts, and may hinder performance.

Accordingly, a need exists for systems and methods enabling (i) flexible and scalable linking of layers of a deep learning network across multiple edge devices, and (ii) optimization of throughput by utilizing a controller to dynamically partition and place a disaggregated artificial neural network on resource-constrained devices or edge devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLES

Overview

Figure 1:
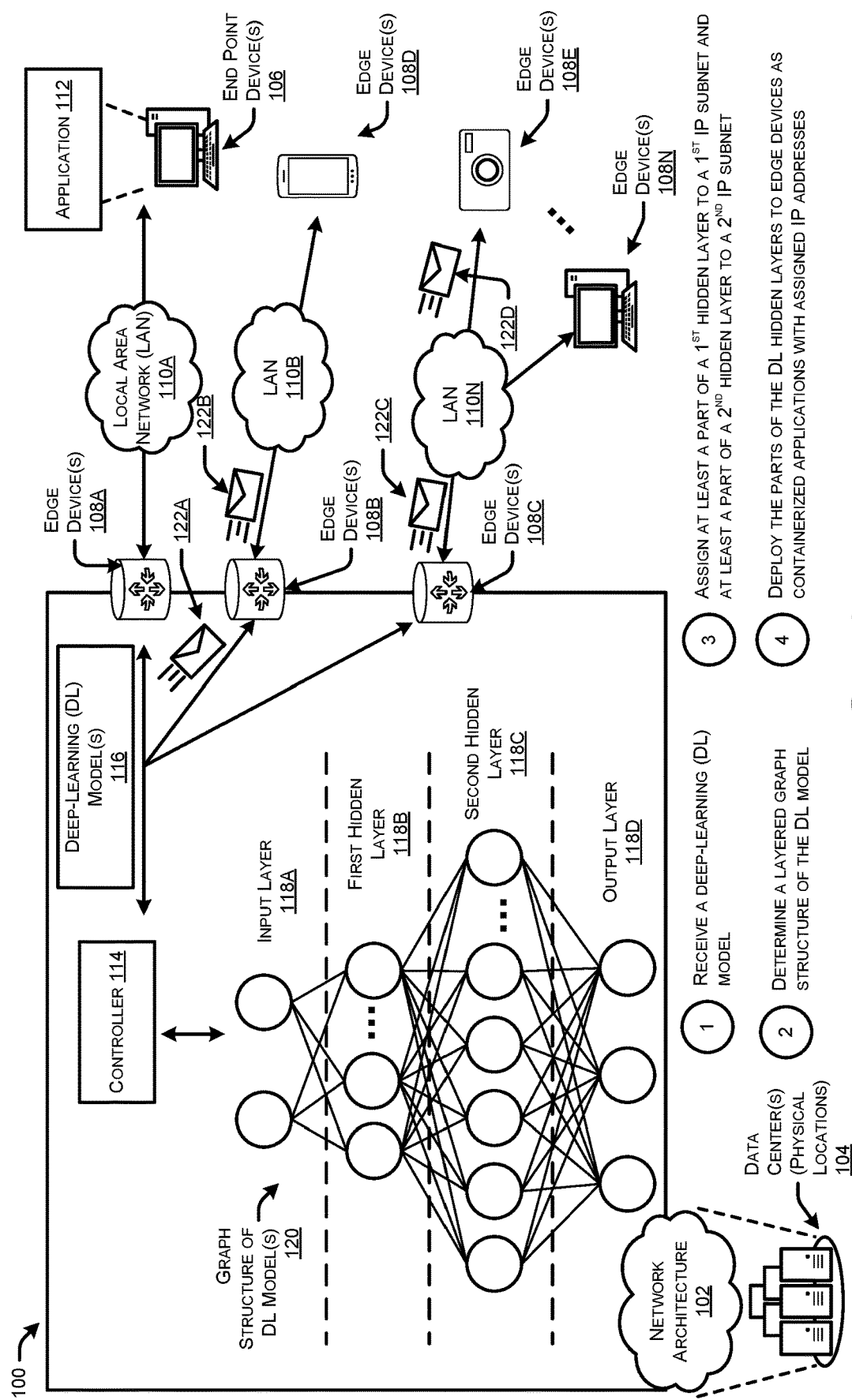
FIG. 1 illustrates a system-architecture diagram of an environment in which hidden-layer routing for a disaggregated artificial neural network can apply IP routing to partition a neural network model across edge device(s) in a network to efficiently resolve root cause analysis issues, predict service level agreement (SLA) violations, avoid latency, etc.

The present application relates generally to the field of computer networking, and more particularly to, in a systems context, enabling hidden-layer routing for a disaggregated artificial neural network to apply IP routing to partition a neural network model across resource-constrained devices or edge device(s) in a network to efficiently perform RRM, e.g., resolve root cause analysis issues, predict service level agreement (SLA) violations, avoid latency, etc. This application addresses the problems of (i) assigning an Internet Protocol (IP) subnet to layer(s) of the DNN as well as, in some instances, assigning an IP address to each artificial neuron in the layer, and (ii) optimizing throughput by utilizing a controller to dynamically partition and place a disaggregated ANN on resource-constrained devices or edge device(s). The technology described herein solves these problems by overlaying a DL model as a graph over a physical network and uses IP routing to link the hidden layer of the DL model, reflecting the structure of the neural network. This approach includes assigning hidden layers, or parts of hidden layers, between the input and the output layers of a DL model, to different edge devices for processing. The various edge devices can pass the output of one layer into the input of the next layer, which can be on a different device.

A method to perform techniques described herein can be implemented by a controller and can include receiving, from an application, input including a DL model, determining a graph structure of the DL model including neurons organized in layers that include an input layer, multiple hidden layers, and an output layer, assigning at least a part of a first hidden layer to a first IP subnet and at least a part of a second hidden layer to a second IP subnet, and deploying the layers to edge devices as containerized applications with assigned IP addresses.

Additionally, any techniques described herein, may be performed by a system and/or device having non-transitory computer-readable media storing computer-executable instructions that, when executed by one or more processors, configure the processors to perform the method(s) described above and/or one or more non-transitory computer-readable media storing computer-readable instructions that, when executed by one or more processors, cause the one or more processors to perform the method(s) described herein.

EXAMPLES

A computer network can include different nodes (e.g., network devices, edge devices, end-point devices, client devices, sensors, and any other computing devices) interconnected by communication links to send data between end nodes. Many types of networks are available, including for example, local area networks (LANs), wide-area networks (WANs), software-defined networks (SDNs), wireless networks (Wi-Fi™), core networks, cloud networks, the Internet, etc. When data traffic is transmitted through one or more networks, the data traffic can traverse several nodes that route the traffic from a source node to a destination node. Numerous dynamic events happen in wireless networks. As an example, access points change radio frequencies, features that the wireless networks run, etc., and a goal is to optimize the performance of the wireless networks accounting for such dynamic events.

These networks often include specialized network devices to communicate packets representing a variety of data from device-to-device, such as switches, routers, servers, access points, etc. Each of these devices is typically designed and configured to perform different networking functions. For instance, switches generally act as controllers that allow devices in a network to communicate with each other. Routers generally connect multiple networks together and connect computers on those networks to the Internet by acting as a dispatcher in networks by analyzing data being sent across a network and choosing an optimal route for the data to travel. Access points typically act like amplifiers for a network that can extend the bandwidth provided by routers so that the network can support many devices located further distances from each other.

In recent years, a rapidly growing number of new applications integrate a cloud-offloaded processing. Traditionally, "cloud" refers to remote cloud, a cloud placed in a datacenter and connected to the devices associated with individual users through the core infrastructure of the internet. One advantage of remote clouds is their near-infinite compute-power and capacity. Accordingly, cloud-offloaded applications are different from classical standalone applications at least because a part of their processing is done remotely in a cloud. However, the location of remote clouds is usually quite far from the devices associated with individual users, and the data-sources and access paths of the cloud are also out of control for the user. Moreover, cloud offloading may cause high latency, high jitter, high error rate, low available bandwidth, intermittent connectivity, GRPD and legal issues that are incompatible with some emerging applications (e.g., remote medical surgery, offloaded automated driving or real-time detection, etc.). Further, when artificial intelligence applications that process real-time streaming data at the edge are presented with strict service level agreements (SLAs) or privacy restrictions, deployment in the cloud can become difficult.

One proposed solution is edge offloading. The idea is to deploy machine learning, deep learning (DL) or inference models, to multiple machines at the edges of a network, which can perform quick classification based on events that are happening in different places of the network or networks, e.g., wireless networks. These edge devices (e.g., access points, home-automation devices (such as refrigerators, washing machines, dryers, dishwashers, thermostats, other smart devices), sensors, microphones, cameras, smartphones, tablets, desktop computers, RaspberryPi computers, etc. including at least one processing unit, e.g., Central Processing Unit (CPU), Tensors Processing Unit (TPU), low-powered processor, etc.) can be located close to sensors or devices associated with individual users (e.g., some cameras have an integrated TPU or can be located further away (e.g., on the same LAN or the same access network (in cases of mobile networks for example)). Currently, most DL applications that run on edge devices are composed of a monolithic pre-trained Deep Neural Network (DNN) that runs inference on data generated at the edge devices. However, most DNNs are often too heavy to run on the edge devices, such that a vast majority of deep learning-based applications are run on remote clouds. In the case of real-time or latency-sensitive applications, or in cases where policy compliance forbids data from leaving the edge devices, offloading inference to the remote cloud is not an option.

Moreover, in resource constrained networks, users (e.g., such as developers) wanting reasonable performance for heavy deep learning workloads often need to choose between buying hardware acceleration equipment or downsizing their neural networks. However, additional hardware acceleration equipment (GPUs, TPUs, etc.), is expensive. Further, downsizing the neural network also requires extended development efforts, and may hinder performance.

Accordingly, a need exists for systems and methods of enabling (i) flexible and scalable linking of layers of a deep learning network across multiple edge devices, and (ii) optimization of throughput by utilizing a controller to dynamically partition and place a disaggregated artificial neural network on resource-constrained devices or edge devices. This application describes solutions to these problems including, (i) assigning an Internet Protocol (IP) subnet to layer(s) of the DNN as well as, in some instances, assigning an IP address to each artificial neuron in the layer, and (ii) optimizing throughput by utilizing a controller to dynamically partition and place a disaggregated ANN on resource-constrained devices or edge device(s). The technology described herein involves overlaying a DL model as a graph over a physical network and uses IP routing to link the hidden layer of the DL model, reflecting the structure of the neural network. This approach includes assigning hidden layers, or parts of hidden layers, between the input and the output layers of a DL model, to different edge devices for processing. The various edge devices can pass the output of one layer into the input of the next layer, which can be on a different device.

This disclosure describes techniques and mechanisms enabling connection of hidden layers across resource-constrained devices or edge devices and creating a pattern of the layers of the neural network according to the particular type of neural network based on IP routing of the particular physical network. This disclosure describes techniques and mechanisms that accommodate various types of DNNs including feed forward networks, Convolutional Neural Networks (CNNs), Artificial Neural Networks (ANNs), Long-Short-Term Memory type neural networks (LSTMs), Support Vector Machines (SVMs), etc., and through assignment of different resource-constrained devices or edge devices to the layers according to IP routing, enable the DNN to pass data through a NN distributed across multiple resource constrained devices or edge devices as though the NN were on a single chip.

One example of how to process data through a deep learning network without bringing the data back to the cloud is to keep it local, make a local routing decision, e.g., if there are ten hidden layers in a deep learning network, those ten different hidden layers can be on ten different virtual compute nodes and/or edge devices. In various examples, if the network is a Wi-Fi™ network, the edge devices can include access points (APs) that are passing layers to different APs, other edge devices, and/or end devices. Assignment of IP routing, e.g., IPv4 or IPv6, provides flexibility around the size of the network as well as accommodating dynamic changes in the network. The system applies IP routing to neural network design and deployment. The system can move the output of a neuron to be the input of the next neuron akin to movement of packets in IP routing. In the system, a controller can construct a neural network based on IP routing by assigning a network address to a hidden layer. For example, assigning an IPv6 subnet to hidden layers (HL) as follows.

HL1→2002:ABCD:1000:0001:0/64
HL2→2002:ABCD:1000:0002:0/64
HL3→2002:ABCD:1000:0003:0/64
HL4→2002:ABCD:1000:0004:0/64

Each line above represents different /64 subnets that can be assigned to the respective hidden layer. A controller can create this assignment scheme by examining a neural network, extrapolating what IP routing would look like from a neural network perspective, assigning subnets, e.g., IPv6 subnets, to the individual neural networks, and creating that layer, or a part of that layer, within respective virtual-compute devices or edge devices. The controller can add an IP routing on forwarding aspect for the input/output of the layers of the neural network so that the controller can connect the neurons to define the routing, so the data passes from 0001 to 0002, and from 0002 to 0003, etc. In this way, the system can create and structure the neural network routing on the fly using a controller, e.g., an IP Network Controller, to move the data through the hidden layers.

In some examples, a controller can receive, from an application, input including a deep learning model. In some examples, neural networks can be enormous, e.g., including a hundred million or more input nodes or input vectors. In such examples, the system can employ an IP routing scheme that is expected to be able to handle that huge number of nodes, such as IPv6. The controller can determine a graph structure of the deep learning model including neurons organized in layers that include an input layer, a plurality of hidden layers, and an output layer. The controller can assign to a first IP subnet, at least a part of a first hidden layer of the plurality of hidden layers. The controller can assign to a second IP subnet, at least a part of a second hidden layer of the plurality of hidden layers. The controller can deploy the parts of the first and second hidden layers to edge devices as containerized applications with assigned IP addresses. In various examples, more than one layer can be assigned to an edge device, or a layer can be assigned across separate devices. For example, the system is flexible to accommodate if a device is somewhat higher powered or has more available bandwidth; in that case, the controller can place two or more layers on the higher-powered device. Thus, there can be multiple subnets processing on the same edge device because of the controller moving the subnets to virtual nodes to share an edge device. In some examples, a layer can be assigned across separate devices. For example, in some instances, the system can assign an address to individual neurons of a neural network, which can be useful when available edge devices are particularly low powered, but plentiful. In some examples, the system can subdivide a hidden layer between multiple different edge devices based on subgrouping of neurons without assigning a separate address to individual of the neurons. Thus, there can be parts of a single hidden layer processing on multiple separate edge devices because of the controller moving the neurons to individual of multiple separate edge devices. Examples in which an address is assigned to individual neurons of a neural network, the routing can become very granular. In such examples, IPv6 may be particularly useful compared to IPv4 for scalability.

In some examples, the controller can create a next-hop-routing sequence based on layer-to-layer communication in the graph structure of the deep learning model. In various examples, the controller can extrapolate per-hop routing for individual neurons of the first hidden layer and second hidden layer. In some examples, the controller can deploy per-hop routing for individual neurons of the first hidden layer to individual containers of the containerized applications to cause correct flow of data between layers of the graph structure. In various examples, the controller can assign a second part of the first hidden layer to a third IP subnet. In some examples, the controller can create an IP routing topology based on the graph structure. In various examples, the controller can create an IP routing topology that bypasses a neuron that has weight zero or null. When the input weight of a neuron is zero, or null, the neuron is no longer useful to the DNN. In that case, the controller can employ IP routing, e.g., a route to null zero to optimize the routing. In some examples, the controller can modify the IP routing topology based on resource availability on at least one of the edge devices.

As used herein, the terms "machine learning," "machine-trained," and their equivalents, refer to a computing model that can be optimized to accurately recreate certain outputs based on certain inputs. In some examples, the machine learning models include artificial intelligence (AI) models, such as deep learning models, including convolutional neural networks (CNN), deep learning neural networks (DNN), and/or artificial intelligence models. The term "neural network," and its equivalents, refer to a model with multiple hidden layers, wherein the model receives an input (e.g., a vector) and transforms the input by performing operations via the hidden layers. An individual hidden layer includes multiple "neurons," each of which may be disconnected from other neurons in the layer. An individual neuron within a particular layer can be connected to multiple (e.g., all or part) of the neurons in the previous layer. A neural network further includes at least one fully-connected layer that receives a feature map output by the hidden layers and transforms the feature map into the output of the neural network. In some examples, the neural network comprises a graph where each node of the graph represents a layer within the neural network. Each node can be connected as part of a chain (e.g., a concatenation of layers). In some examples, input can be received by a node within the graph, the input is computed by the node, and the input gets passed to one or more additional nodes in the chain.

As used herein, the terms "workload," "AI workload," "DL workload," and their equivalents refer to a neural network model, a deep learning neural network model and/or an artificial intelligence model. As used herein, the terms "portion" or "part" of the DL workload, "portion(s)" or "part(s)" of the DL workload(s), and their equivalents, refer to a portion or part of the neural network model, AI model, and/or deep learning neural network model. For instance, a portion or part of the neural network model can correspond to a single layer of the neural network model and/or multiple layers of the neural network model and/or an individual or multiple neurons of layer(s) of the neural network model.

In some examples, the controller can partition and distribute the AI model to one or more workers. As used herein "workers" refers to edge device(s) and/or edge node(s) within the network. In some examples, the edge devices can receive one or more portion(s) of the AI model. The edge device(s) can run inference on the portion(s) of the AI model(s). In some examples, the controller can communicate with the edge device(s) using one or more protocols (e.g., REST, gRPC, or any other suitable protocol).

In this way, a system for hidden-layer routing of disaggregated artificial neural networks can assign and move or reassign hidden layers of DL model(s) or parts of hidden layers of the DL model(s) to the available compute resources at the edge node(s) without compromising on the performance, while optimizing overall inference throughput. Moreover, the system can split heavy neural network workloads into multiple parts, enabling processing of the workload on a set of resource constrained, less powerful compute nodes in a distributed manner without compromising on the performance while meeting service level agreements (SLA), and without neural network designers having to consider the reduced resources of individual edge devices. Accordingly, by optimizing throughput of the neural network model, a user can run a large and comprehensive DL model at the edge without the need to invest in additional, dedicated hardware, thereby decreasing costs associated with the system. Moreover, by enabling the system to appear as a hardware acceleration system to a user, the user can simply interact with a pre-deployed service through a simple containerized application, e.g., SDK, that resembles those already used for hardware acceleration, such that users easily insert the system for hidden-layer routing of disaggregated artificial neural networks into their code, thereby streamlining usability of the system.

Certain examples will now be described more fully below with reference to the accompanying figures, in which various aspects are shown. However, the various aspects can be implemented in many different forms and should not be construed as limited to the specific examples set forth herein. The disclosure encompasses variations of the examples described herein. Like numbers refer to like elements throughout.

FIG. 1 illustrates a system-architecture diagram of an environment 100 in which hidden-layer routing for a disaggregated artificial neural network can apply IP routing to partition a neural network model across edge device(s) in a network to efficiently resolve root cause analysis issues, predict service level agreement (SLA) violations, avoid latency, etc.

In some examples, the environment 100 can include a network architecture 102 that includes devices housed or located in one or more data centers 104. The network architecture 102 can include one or more networks implemented by any viable communication technology, such as wired and/or wireless modalities and/or technologies. The network architecture 102 can include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 can include devices, virtual resources, or other nodes that relay packets from one network segment to another by nodes in the computer network. The network architecture 102 can include multiple devices that utilize the network layer (and/or session layer, transport layer, etc.) in the OSI model for packet forwarding, and/or other layers.

The one or more data centers 104 can be physical facilities or buildings located across geographic areas that designated to store networked devices that are part of network architecture 102. The data centers 104 can include various networking devices, as well as redundant or backup components and infrastructure for power supply, data communications connections, environmental controls, and various security devices. In some examples, the data centers 104 can include one or more virtual data centers which are a pool or collection of cloud infrastructure resources specifically designed for enterprise needs, and/or for cloud-based service provider needs. Generally, the data centers 104 (physical and/or virtual) can provide basic resources such as processor (CPU), memory (RAM), storage (disk), and networking (bandwidth). However, in some examples the devices in the network architectures 102, e.g., packet-forwarding network architectures, may not be located in explicitly defined data centers 104 and may be located in other locations or buildings.

In some instances, the environment 100 includes a network device and is included as part of a network architecture 102. The network architecture 102 can generally include, manage, or otherwise be associated with one or more applications or services utilized by users accessing network(s). Network(s) can comprise any combination of any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 can provide any type of application or service for use by users of client devices (not shown). In various instances the environment 100 can be associated with any type of computing device and be used for any purpose. In some examples, environment 100 includes an access point, a router, a switch, or any other type of device included in a network architecture.

As illustrated, the environment 100 includes end point device(s) 106 and edge device(s) 108. In some examples, end point device(s) 106 comprise computing device(s), such as user device(s) (e.g., computers, mobile devices, cameras, etc.) that collect data. For instance, in some examples, the end point device 106 can comprise a smart camera. The edge device(s) 108 can process the data collected by the end point devices 106 and can comprise any computing device, network device (e.g., routers, switches, servers, etc.), sensors, microphones, smart cameras, user generated data, or any other device with processing capabilities. In some examples, the edge device(s) (e.g., edge device(s) 108A-108N) are included on the edge of the internet service provider network. In the illustrative example, edge devices 108A-108N are included as part of the network architecture 102. Additionally, or alternatively, the edge device(s) 108 can be part of a user's local network, such as edge device 108N and can receive the data via the LAN 110N. For instance, edge device 108 can be included as part of a user's LAN 110N. While the illustrative example shows a user's local network as being a LAN 110, the local network 110 can comprise any local network, such as a PAN, CAN, MAN, and/or WAN.

As illustrated the end point device(s) 106 can include an application 112. In some examples, the application 112 can comprise a software development kit (SDK). In some examples, the application can correspond to the execution of an AI model with a specific service level objective (SLO). The application 112 can be configured to interface with the controller 114. In some examples, the application can utilize a variety of protocols including REST and/or gRPC.

As illustrated, the environment 100 includes a controller 114. In some examples, the controller 114 is configured to manage synchronization between the edge device(s) 108. In some examples, the controller 114 can enable the application 112 to access one or more services provided by a service provider. In some examples, the controller 114 can be configured to receive commands from applications (e.g., such as application 112) that leverage the service provided by the controller 114.

As illustrated, the controller 114 can receive input from the end point device(s) 106 and/or the application 112. In some examples, the input can comprise one or more deep learning (DL) model(s) 116 (e.g., such as neural network model(s)). As noted above, the DL model(s) 116 can comprise any of a variety of deep learning neural network (DNN) models. As illustrated in FIG. 1, the DL model(s) 116 can comprise multiple layers, such as an input layer 118A, hidden layer(s) 118B and 118C, and an output layer 118D. For instance, the DL model(s) 116 can receive an input (e.g., a vector) at the input layer 118A and transforms the input by performing operations via the hidden layers 118B and 118C. An individual hidden layer can include multiple "neurons," each of which can be disconnected from other neurons in the layer. An individual neuron within a particular layer can be connected to multiple (e.g., all) of the neurons in the previous layer. As illustrated, the DL model(s) 116 can further include at least one fully-connected layer (e.g., the output layer 118D) that receives a feature map output by the hidden layers and transforms the feature map into the output of the DL model(s) 116. In some examples, the DL model(s) 116 comprise a more complex DNN architecture. For instance, the DL model(s) 116 can comprise a SqueezeNet, YOLO, or any other suitable DNN or neural network architecture.

At "1", the controller 114 can receive input including an DL model. In some examples the DL model comprises a neural network model that is configured to process data generated by a computing device. In some examples, the controller 114 can receive the DL model(s) 116 from an end point device 106. In some examples, the controller 114 can receive the DL model(s) 116 from an application 112 on the end point device 106. In some examples, the DL model(s) 116 comprises a pre-trained model and/or a pre-trained weighted model. In some examples, the DL model(s) 116 is pre-trained using machine learning technique(s) described above. For instance, the controller 114 can receive the DL model(s) 116 from an end point device 106 and/or application 112. The controller 114 can apply the DL model(s) 116 to, for example, input that can include a stream of input data, such as from a smart camera. In this example, the DL model 116 can be configured for detecting movement in front of the smart camera based on layers 118. As described above, the edge device(s) 108 may not have a large amount of processing power. For instance, the edge device(s) 108 can be configured to process 1-2 frames per second. Accordingly, if an object in front of the smart camera moves quickly enough, the smart camera can miss the object. In some examples, the controller 114 can identify a network topology and/or device capabilities of device(s) within the network.

At "2", the controller 114 can determine a layered graph structure 120 of the DL model(s) 116 for use in routing data packets 122 associated with the DL model(s) 116. For instance, the controller 114 can create a next-hop-routing sequence based on layer-to-layer communication in the graph structure 120 of the DL model(s) 116 to route data packets 122A, 122B, 122C, and 122D. In some examples, the controller 114 can extrapolate per-hop routing for individual neurons of the input layer 118A, the first hidden layer 118B, the second hidden layer 118C, and the output layer 118D of the graph structure 120, and data associated with the individual neurons of the first hidden layer 118B can be represented by data packet 122A, 122B, and 122C, while data associated with the individual neurons of the second hidden layer 118C can be represented by data packet 122D. As described in greater detail below with regard to FIG. 2, the controller 114 can extract information including extracting individual layer consumptions, vector sizes between layers, node capacities, and/or link bandwidths. Accordingly, by extracting the individual layer consumptions, sizes of the vectors between layers, the target node capabilities, and the bandwidth of the network connection between the nodes, the controller 114 can provide an improved method for calculating an optimal way to deploy the layers of the DL model.

At "3", the controller 114 can assign at least a part of a first hidden layer for processing at a computing device of a first IP subnet and at least a part of a second hidden layer for processing at a computing device of a second IP subnet. Thus, the controller 114 can identify computing device(s) at which to run workload(s) associated with the respective portion(s) of the DL model 116. In some examples, the computing device(s) correspond to one or more edge device(s) 108 or end point devices 106. In some examples, a first portion of the DL workload corresponds to a first portion of the DL model 116. The controller 114 can assign to a first IP subnet, at least a part of a first hidden layer 118B of the plurality of hidden layers and to a second IP subnet, at least a part of a second hidden layer 118C of the plurality of hidden layers. In some examples, one or more of the IP subnets includes an IPV6 subnet.

At "4", the controller 114 can deploy the parts of the DL hidden layers 118B and 118C to edge devices as containerized applications with assigned IP addresses. In some examples, the assigned IP addresses includes an IPV6 address. For instance, the controller 114 can deploy the containerized applications to the one or more edge device(s) 108. In some examples, individual containers can be deployed and started on the LAN 110 using an execution model (e.g., Kubernetes, Virtual Machines, or any other appropriate execution model). In some examples, and as illustrated in FIG. 1, a first portion of the DL workload 122A can be deployed to a first edge device 108B for processing, and after processing can be passed as DL workload 122B to edge device 108D for further processing. For instance, the first edge device 108B can be included as part of the edge of the network architecture 102, and the second edge device 108D can be included as part of a local network 110 associated with one or more users. In some examples, and as illustrated in FIG. 1, a second portion of the DL workload 122C can be deployed to edge device 108C, and after processing can be passed as DL workload 122D to edge device 108N for further processing. For instance, the first edge devices 108C can be included as part of the edge of the network architecture 102, and the second edge device 108N can be included as part of a local network 110 associated with one or more users.

Figure 2:
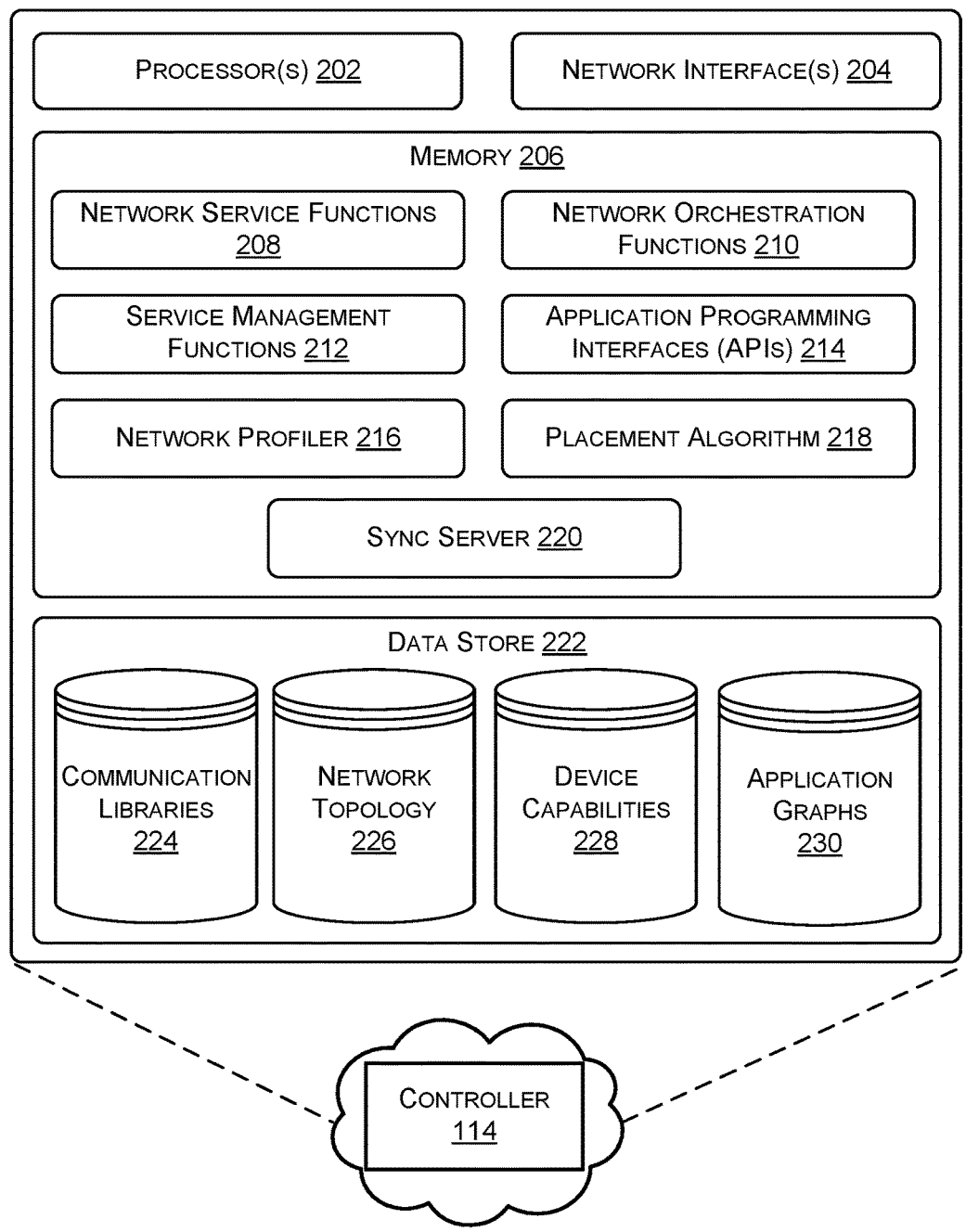
FIG. 2 illustrates a component diagram of an example controller described in FIG. 1.

FIG. 2 illustrates a component diagram of an example controller 114 that receives input including DL model(s) and/or stream(s) of data, determines a layered graph structure of the DL model(s), assigns parts of hidden layers of the DL model(s) to IP subnets, and deploys the parts of the hidden layers to edge devices as containerized applications with the assigned IP addresses. In some instances, the controller can run on one or more computing devices in, or associated with, the network architecture 102 (e.g., a single device or a system of devices). The controller can comprise a single controller that is running, or multiple instances of a network controller running at least partly at a same time.

Generally, the controller 114 can include a programmable controller that is configured to manage some or all of the control plane activities of the network architecture 102 and to manage or monitor the network state using one or more centralized control models. Generally, the controller 114 can handle at least the functions of (i) receiving, from an application, input including a deep-learning model, (ii) determining a layered graph structure of the DL model, (iii) assigning part of a first hidden layer to a first IP subnet and part of a second hidden layer to a second IP subnet, and (iv) deploying parts of the DL hidden layers to edge devices as containerized application with assigned IP addresses.

As illustrated, the controller 114 can include, or run on, one or more hardware processors 202 (processors), one or more devices configured to execute one or more stored instructions. The processor(s) 202 can comprise one or more cores. Further, the controller 114 can include or be associated with (e.g., communicatively coupled to) one or more network interfaces 204 configured to provide communications with the edge device(s) 108, end point device(s) 106, and other devices, and/or other systems or devices in the network architecture 102 and/or remote from the network architecture 102. The network interfaces 204 can include devices configured to couple to personal area networks (PANs), wired and wireless local area networks (LANs), wired and wireless wide area networks (WANs), and so forth. For example, the network interfaces 204 can include devices compatible with any networking protocol.

The controller 114 can also include memory 206, such as computer-readable media, that stores various executable components (e.g., software-based components, firmware-based components, etc.). The memory 206 can generally store components to implement functionality described herein as being performed by the controller 114. The memory 206 can store one or more network service functions 208, such as a slicing manager, a topology manager to create and manage a topology of the network architecture 102, a host tracker to track what network components are hosting which programs or software, a switch manager to manage switches of the network architecture 102, a process manager, and/or any other type of function performed by the controller 114.

The controller 114 can further include network orchestration functions 210 stored in memory 206 that perform various network functions, such as resource management, creating and managing network overlays, programmable APIs, provisioning or deploying applications, software, or code to hosts, and/or perform any other orchestration functions.

Further, the memory 206 can store one or more service management functions 212 configured to manage the specific services of the network architecture 102 (configurable). In some examples, the service management functions 212 can include a prediction mechanism to make a determination of how many hidden layers to put on each node. In various examples, the service management functions 212 can employ a blind approach, e.g., assigning one on each node. In some examples, the service management functions 212 can use a prediction mechanism to identify, e.g., node(s) that can take two layers, one layer, half a layer, etc., to proactively assign an appropriate number of layers to individual of the nodes because some layers may have fewer active neurons than others, null weights on some neurons, etc.

In addition, the memory 206 can store one or more APIs 214 and/or API server(s) for communicating with devices in the network architecture 102 and causing various control plane functions to occur. For instance, the API server can receive commands from outside applications (e.g., such as application 112). The commands can include instructions to (i) populate an AI model, (ii) identify input data stream(s) and/or output data stream(s) for the controller 114 to connect to, (iii) re-compute partitioning and placements, and/or (iv) any other suitable command.

Further, the controller 114 can include a network profiler 216. The network profiler 216 can be configured to receive a pre-trained DL model and/or a pre-trained weighted DL model as an input and output an application graph. In some examples, the application graph can include layers and associated neurons in the topology of the DL model. In some examples, the network profiler 216 can be configured to extract information from the DL model and/or edge network. For instance, the network profiler 216 can extract information including extracting individual layer consumptions, vector sizes between layers, node capacities, and/or link bandwidths. Accordingly, by extracting the individual layer consumptions, sizes of the vectors between layers, the target node capabilities, and the bandwidth of the network connection between the nodes, the system (e.g., such as the placement algorithm 218) can provide an improved method for calculating the optimal way to split and deploy the model.

The controller 114 can further include a placement algorithm 218. In some examples, the placement algorithm can utilize the information from the network profiler 216 to identify optimized placement of parts of a workload associated with the hidden layers at edge device(s) 108 to optimize inference throughput (or framerate) of the DL model. In some examples, the optimized placement is identified based at least in part on the network application graph(s) and/or the DL model application graph(s) output by the network profiler 216.

The controller 114 can include a sync server 220. In some examples, the sync server is configured to handle synchronization between the controller 114 and the edge device(s) 108 and/or end point device(s) 106. For instance, the sync server 220 can be configured to package individual portions 122 of the layers 118 of the DL model 116 and deploy the individual portions 122 over the network(s) and/or local network(s) 110.

In some examples, the sync server 220 can include a communication interface and/or can track state(s) associated with one or more of the edge device(s) 108. For instance, the sync server 220 can be configured to monitor the edge device(s) 108 and detect if one or more conditions (e.g., a node goes down, a node loses connection to the network and/or local network 110, there is a change in bandwidth available to a node, there is a change in an amount of CPU available to a node such that performance of the node is degrading) of the network and/or local network 110 changes. For instance, the network profiler 216 can detect that a node (e.g., an edge device 108) within the LAN 110 has a change in the amount of CPU available to the node, such that performance of the node is degrading (e.g., such as CPU overload). The network profiler 216 can monitor performance of edge nodes processing the distributed hidden layers. For example, the network profiler 216 can identify that throughput of a node has reduced indicating that there is an issue with processing on that node, and the sync server 220 can move all of part of the hidden layer assigned to that node to another node. In various examples, the system can include continual and/or periodic monitoring processing performance of one or more of the hidden layer segments or subsegments, and when the network profiler 216 identifies performance dipping below an identified acceptable threshold, the sync server 220 can configure the controller to move the underperforming hidden layer(s) or part of them and dynamically change the routing.

In some examples, sync server 220 can configure a flow control mechanism to move data through a DL model, e.g., an inference model, in which throughput can be dependent upon bandwidth. For example, how many inferences can a node make per second, which will be based on the available computing resources, e.g., CPUs, because the edge device nodes will typically lack high-powered processing resources like GPUs. The sync server 220 can configure the flow control mechanism for the controller to change the flow, like a feedback mechanism on one node. Reduced throughput can be attributed to a variety of issues relative to the distributed neural network. For example, the edge device(s) may get requests for processing for their regular jobs, and that can suggest or dictate a redistribution of the layers to optimize processing. As another example, the edge device(s) may suffer a hardware failure, and that can also suggest or dictate a redistribution of the layers to optimize processing. Disaggregation provides for controlling the flow of data across the hidden layers, for example, when one node is getting slow, such as because the CPU is being used for more of its typical processing tasks. The system can implement feedback to the previous layer that can cause a request to slow the output of data from a previous node that is the input of data to the slow CPU because it is becoming or already is backed up. The sync server 220 can implement such a feedback mechanism to control flow between the layers of the neural network, which provides for dynamic, flexible, and customizable control.

The controller 114 can further include a data store 222, such as long-term storage, that stores communication libraries 224 for the different communication protocols that the controller 114 is configured to use or perform. Additionally, the data store 222 can include network topology data 226, such as a model representing the layout of the network components in the network architecture 102. The data store 222 can store device capabilities 228 that includes telemetry data indicating computing resource usage and/or availability on the different network components in the network architecture 102. The device capabilities can include additional data indicating available bandwidth, available CPU cycles, delay between nodes, computing capacity, processor architecture, processor type(s), etc. Additionally, the data store 222 can include application graphs 230.

Figure 3:
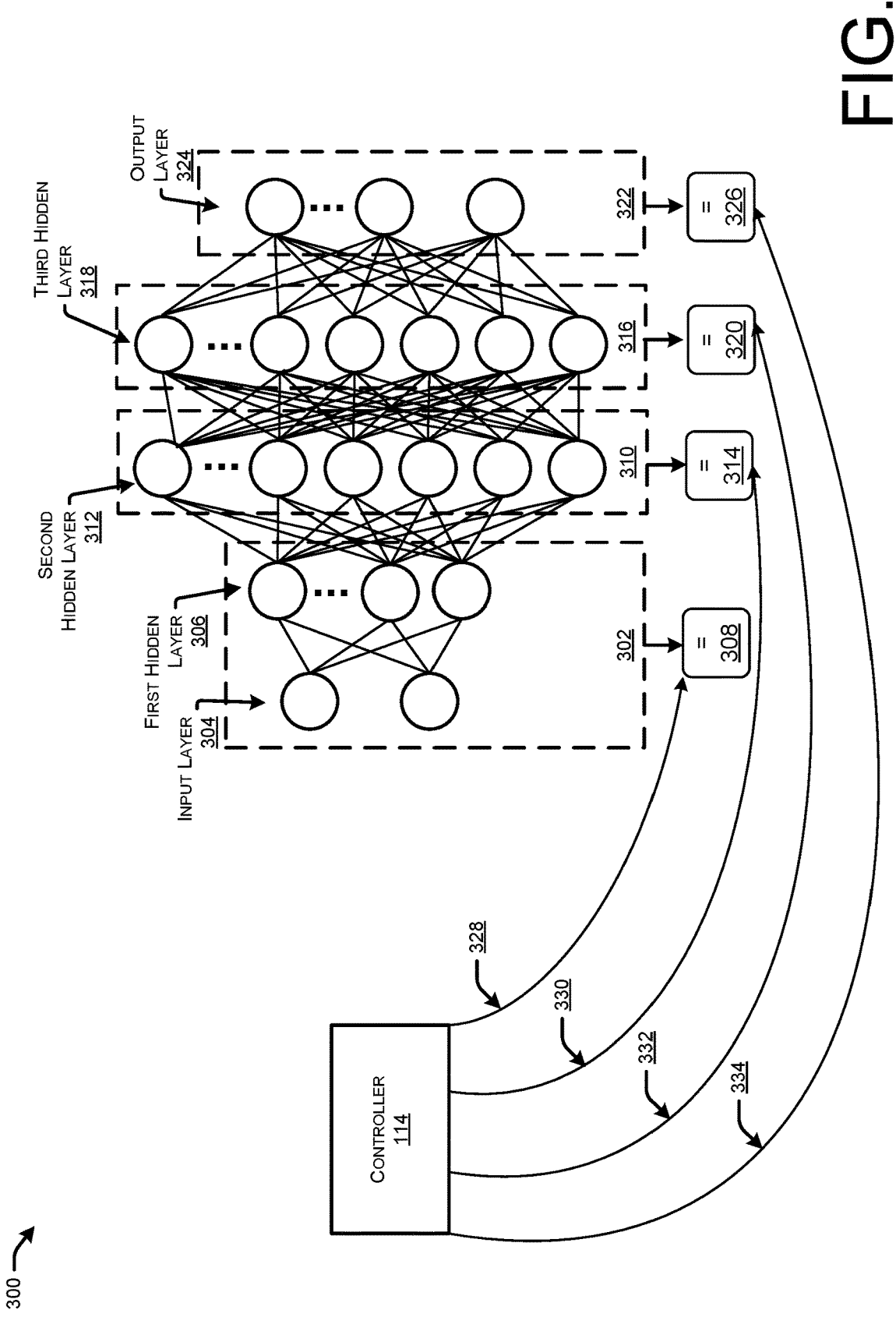
FIG. 3 illustrates example hidden-layer routing between components of a disaggregated artificial neural network system as described herein.

FIG. 3 illustrates a diagram 300 including a flow of data between layers of neurons with example assignments by controller 114 of an IPV6 subnet to several groupings of layers. Controller 114 can examine an ANN and its hidden layers, analyze available resources of a plurality of edge devices or edge nodes, estimate expected throughput of the ANN as an inference model, and assign groupings of hidden layers to the edge nodes. In various examples, controller 114 can assign individual hidden layers of a plurality of hidden layers, and/or individual artificial neurons in one or more of the plurality of hidden layers an address from the subnet. As illustrated, controller 114 can assign a first grouping 302, which includes input layer 304 and first hidden layer 306, to IPv6 subnet 308 (2002:ABCD:1000:0001::0/64). In some examples, controller 114 can assign input layer 304 and first hidden layer 306 to separate subnets. In various examples, in addition to input layer 304 and first hidden layer 306, controller 114 can assign parts of one or more hidden layers to IPv6 subnet 308. In the illustration, controller 114 assigns a second grouping 310, which includes second hidden layer 312, to IPv6 subnet 314 (2002:ABCD:1000:0002::0/64). In the illustrated example, controller 114 assigns a third grouping 316, which includes third hidden layer 318, to IPv6 subnet 320 (2002:ABCD:1000:0003::0/64). As shown in the illustration, controller 114 assigns a fourth grouping 322, which includes output layer 324, to IPV6 subnet 326 (2002: ABCD:1000:0004::0/64). In some examples, controller 114 can group the third hidden layer 318 (or another hidden layer, not shown) and output layer 324 together and the assign them to the same subnet. In various examples, controller 114 can assign parts of one or more of the hidden layers, input layer, or output layer to separate IPv6 subnets.

Diagram 300 also illustrates that the controller 114 can push routing and/or forwarding logic to the edge compute nodes, which allows the graph structure of the DL model to be passed through the network topology as part of a containerized application (the inference part of the inference model). As illustrated at path 328, to node 308, controller 114 can push Route 2002:ABCD:1000:0001::0/64 to 2002: ABCD:1000:0002::0/64; at path 330, to node 314, controller 114 can push Route 2002:ABCD:1000:0002::0/64 to 2002: ABCD:1000:0003::0/64; at path 332, to node 320, controller 114 can push Route 2002:ABCD:1000:0003::0/64 to 2002: ABCD:1000:0004::0/64; and at path 334, to node 326, controller 114 can push Route 2002:ABCD:1000:0003::0/64 to 2002:ABCD:1000:0004::0/64, and exit.

In some examples, a user can be able to interact with the application 112 in order to load DL model(s) 116 and/or input or output streams of data, in order to optimize overall inference throughput. In some examples, the action(s) taken by the controller 114 are hidden from the user(s), such that the user(s) simply interact with a pre-deployed service using a containerized application. The containerized application can resemble systems used for hardware acceleration, such that user(s) can easily utilize the system to insert instructions for hidden-layer routing via disaggregated artificial neural networks into their code. Accordingly, the system or parts of the system in environment 100 can act as a virtual hardware acceleration service and can utilize a distributed inference system as described herein.

In some examples, the sync server 220 of the controller 114 is configured to enable various interactions with the application 112.

Figure 4:
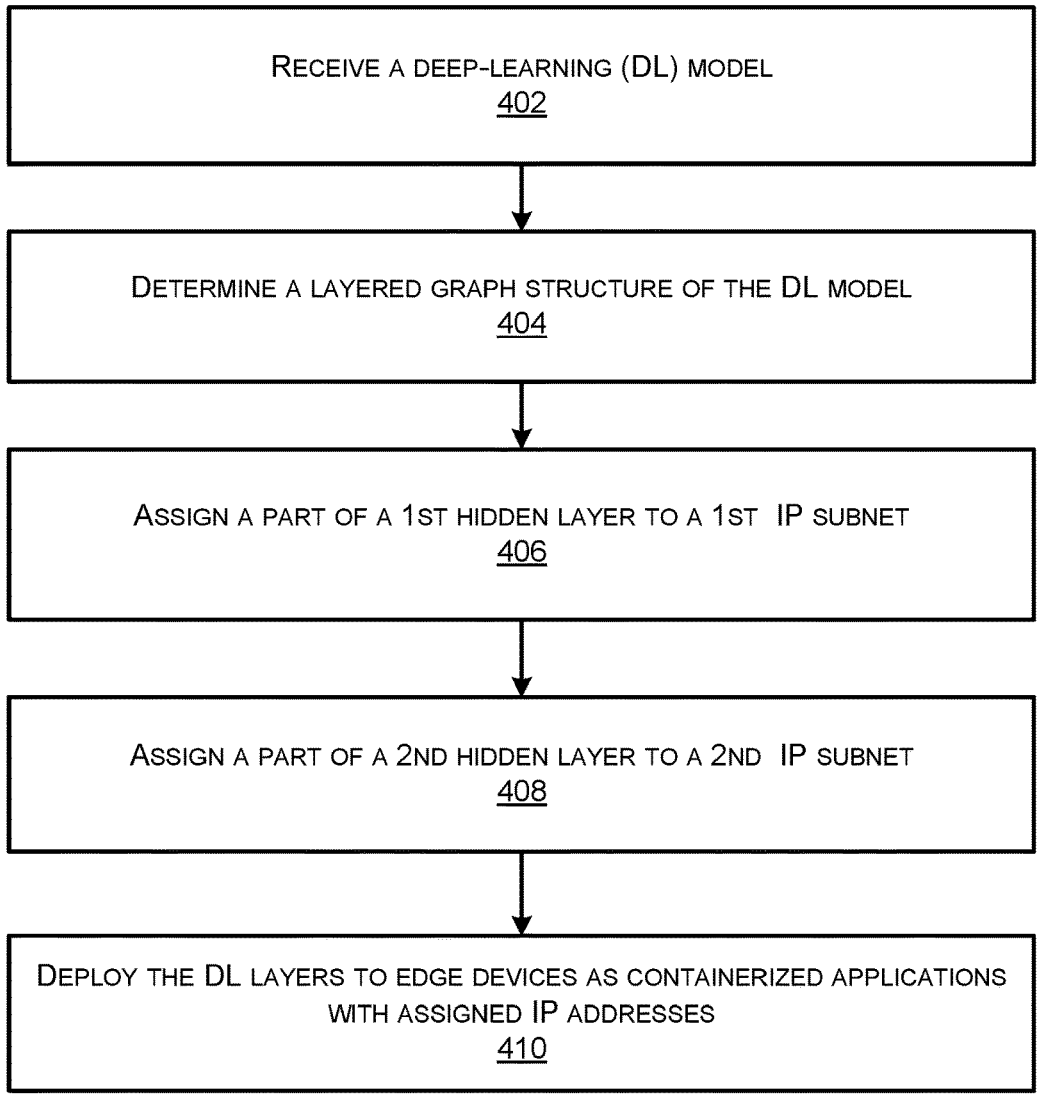
FIG. 4 illustrates a flow diagram of an example method for a controller, e.g., a network controller, to partition and distribute a disaggregated artificial neural network model to edge device(s) in a network to efficiently resolve root cause analysis issues, predict SLA violations, avoid latency, etc.

FIG. 4 is a flow diagram of an example method 400 for a controller, e.g., a network controller, to partition and distribute a DL model, e.g., a disaggregated artificial neural network model to edge device(s) in a network to efficiently resolve root cause analysis issues, predict SLA violations, avoid latency, etc. In some instances, the steps of method 400 can be performed by a device (e.g., controller 114, edge device(s) 108, or any other device) that includes one or more processors and one or more non-transitory computer-readable media storing computer-executable instructions that, when executed by the one or more processors, cause the one or more processors to perform operations of method 400.

At 402, the system can receive input including a DL model. For instance, the system can receive the input from an application (such as application 112 described above). In some examples, the application comprises a containerized application such as a software development kit (SDK). In some examples, the input can comprise one or more input and/or output streams of data. In some examples, the input can comprise a plurality of DL model(s). In some instances, the DL model 116 can comprise a weighted, pre-trained model. In some examples, the input is received from a computing device associated with a user of the network. For instance, the input can be received from an end point device 106.

At 404, the system can determine a layered graph structure of the DL model including an input layer, a plurality of hidden layers, and an output layer. In some examples, the system can identify individual neurons of the particular layers.

At 406, the system can assign a part of a first hidden layer to a first IP subnet. In some examples, the first IP subnet includes an IPV6 subnet. In some examples, the assignment can be based at least in part on information associated with the network topology and/or device capabilities. For instance, the determination that an amount of processing available from a central processing unit (CPU) on a computing device is sufficient to support at least one of the hidden layers and/or the determination that an amount of processing available from a central processing unit (CPU) on a computing device is sufficient to support a fraction of one of the hidden layers.

At 408, the system can assign a part of a second hidden layer to a second IP subnet. In some examples, the second IP subnet includes an IPV6 subnet. In some examples, the system can split the AI model at a plurality of locations. In some examples, the assignment can be based at least in part on information associated with the network topology and/or device capabilities. For instance, the determination that an amount of processing available from a central processing unit (CPU) on a computing device is sufficient to support at least one of the hidden layers and/or the determination that an amount of processing available from a central processing unit (CPU) on a computing device is sufficient to support a fraction of one of the hidden layers.

At 410, the system can deploy the DL layers to edge devices as containerized applications with assigned IP addresses. In some examples, the assigned IP addresses include an IPV6 address.

In some examples, the system can create a next-hop-routing sequence based on layer-to-layer communication in the graph structure of the deep learning model. In various examples, the system can extrapolate per-hop routing for individual neurons of the first hidden layer and second hidden layer. In some examples, the system can deploy per-hop routing for individual neurons of the first hidden layer to individual containers of the containerized applications to control flow of data between layers of the graph structure. In various examples, the system can identify a part of the first hidden layer as a first part and assign a second part of the first hidden layer to a third IP subnet. In some examples, the system can identify the part of the first hidden layer to include all of the first hidden layer. In various examples, the system can create an IP routing topology based on the graph structure. In some examples, the IP routing topology can bypass a neuron having zero, or null, weight. In various examples, the system can modify the IP routing topology based on resource availability on at least one of the edge devices.

Figure 5:
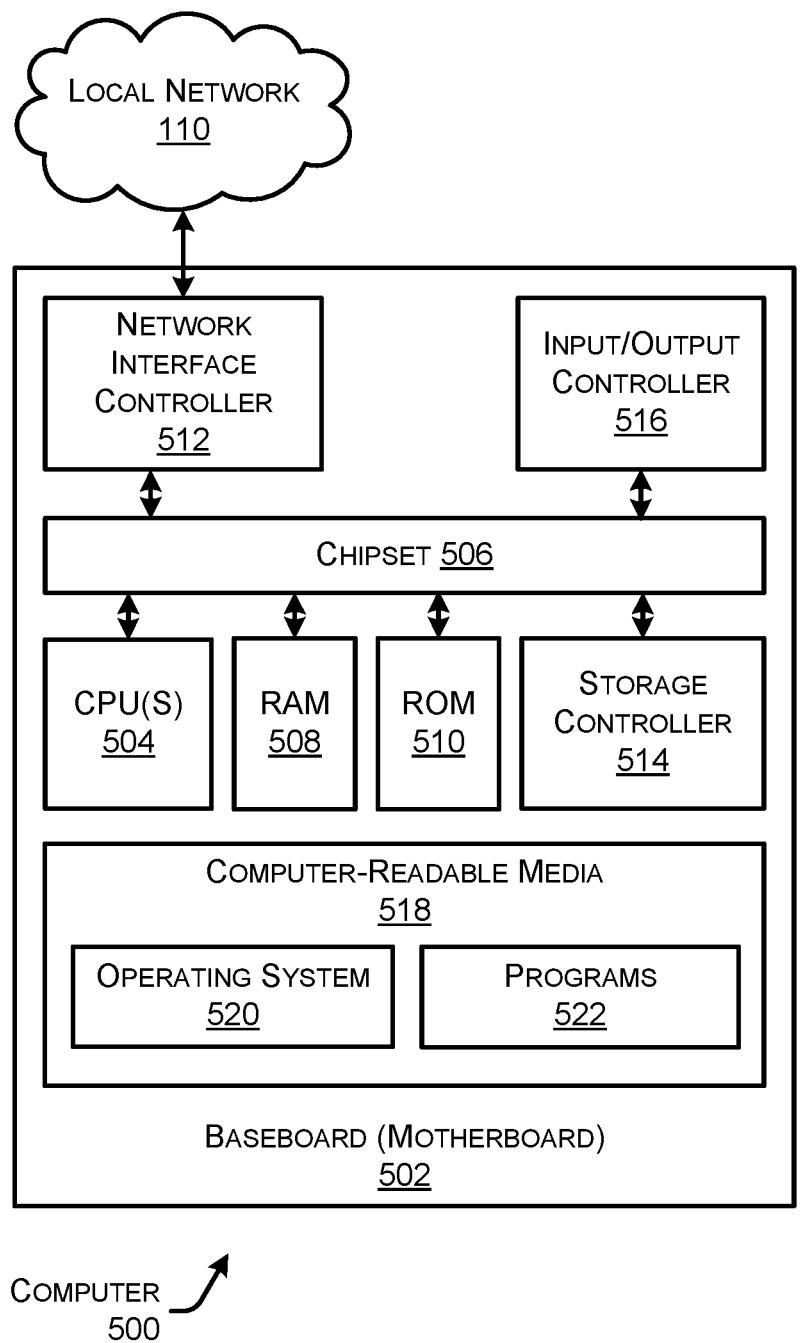
FIG. 5 is a computer architecture diagram showing an illustrative computer hardware architecture for a device that can be utilized to implement aspects of the various technologies presented herein.

FIG. 5 shows an example computer architecture for a device capable of executing program components for implementing the functionality described above. The computer architecture shown in FIG. 5 can illustrate any type of computer 500, such as a conventional server computer, workstation, desktop computer, laptop, tablet, network appliance, e-reader, smartphone, or other computing device, and can be utilized to execute any of the software components presented herein. The computer can, in some examples, correspond to a computer in environment 100, a controller 114, an edge device 108, and/or any other device described herein, and can comprise personal devices (e.g., smartphones, tables, wearable devices, laptop devices, etc.) networked devices such as servers, switches, routers, hubs, bridges, gateways, modems, repeaters, access points, and/or any other type of computing device that can be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to start up the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as local network 110. The chipset 506 can include functionality for providing network connectivity through a NIC 512, such as a gigabit Ethernet adapter. The NIC 512 can connect the computer 500 to other computing devices over the local network 110. It should be appreciated that multiple NICs 512 can be present in the computer 500, connecting the computer to other types of networks and remote computer systems.

The computer 500 can be connected to a storage device, e.g., computer-readable media 518, that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can include one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the system or parts of the system in environment 100, the controller 114, the edge device 108, and/or any components included therein, can be supported by one or more devices similar to computer 500. Stated otherwise, some or all of the operations performed by the system or parts of the system in environment 100, the controller 114, the edge device 108, and or any components included therein, can be performed by one or more computer devices 500.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further examples, the operating system can comprise the UNIX operating system or one of its variants.

It should be appreciated that other operating systems can also be utilized. The storage device 518 can store other system or application programs and data used by the computer 500.

In at least one example, the storage device 518 or other computer-readable storage media is encoded with computer-executable instructions which, when loaded into the computer 500, transform the computer from a general-purpose computing system into a special-purpose computer capable of implementing the examples described herein. These computer-executable instructions transform the computer 500 by specifying how the CPUs 504 transition between states, as described above. According to at least one example, the computer 500 has access to computer-readable storage media storing computer-executable instructions which, when executed by the computer 500, configure the computer to perform the various processes described above regarding FIGS. 1-4. The computer 500 can also include computer-readable storage media that have instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 can comprise one or more of a computer in environment 100, a controller 114, an edge device 108, and/or any other device. The computer 500 can include one or more hardware processors 504 (processors) configured to execute one or more stored instructions. The processor(s) 504 can comprise one or more cores. Further, the computer 500 can include one or more network interfaces configured to provide communications between the computer 500 and other devices, such as the communications described herein as being performed a computer in environment 100, the controller 114, the edge device 108, and/or any other device. The network interfaces can include devices configured to couple to personal area networks (PANs), wired and wireless local area networks (LANs), wired and wireless wide area networks (WANs), and so forth. For example, the network interfaces can include devices compatible with Ethernet, Wi-Fi™, and so forth.

The programs 522 can comprise any type of programs or processes to perform the techniques described in this disclosure for enabling third party applications to utilize optimal partitioning and distribution of neural network model(s) to edge device(s) and improve throughput of inference on neural network model(s). For instance, the programs 522 can cause the computer 500 to perform techniques for efficiently partitioning and distributing a DL model to edge device(s) in a network, including: receiving, from an application, input including a DL model; determining a layered graph structure of the DL model including an input layer, a plurality of hidden layers, and an output layer; assigning a part of a first hidden layer to a first IP subnet; assigning a part of a second hidden layer to a second IP subnet; and; deploying the DL layers to edge devices as containerized applications with assigned IP addresses.

In this way, a system for hidden-layer routing of disaggregated artificial neural networks can optimally assign hidden layers of DL model(s) or parts of hidden layers of the DL model(s), to available compute resources at the edge node(s). The system for hidden-layer routing of disaggregated artificial neural networks can assign and move or reassign hidden layers of DL model(s) or parts of hidden layers of the DL model(s) to the available compute resources at the edge node(s) without compromising the performance of the edge node(s), while optimizing overall inference throughput. Moreover, users are enabled to split heavy neural network workloads into multiple parts, enabling the user to process the workload on a set of smaller, less capable compute nodes in a distributed manner without compromising on the performance while meeting service level agreements (SLA). Accordingly, by optimizing throughput of the neural network model, a user can run a large and comprehensive DL model at the edge without the need to invest in additional, dedicated hardware, thereby decreasing costs associated with the system. Moreover, by enabling the system to appear as a hardware acceleration system to a user, the user can simply interact with a pre-deployed service through a simple containerized application, e.g., SDK that resembles those already used for hardware acceleration, such that users easily insert the system for hidden-layer routing of disaggregated artificial neural networks into their code, thereby streamlining usability of the system. Additionally, the programs 522 can comprise instructions that cause the computer 500 to perform the specific techniques for enabling third-party applications to optimally partition and distribute a neural network model to edge device(s) in a network to increase overall throughput of real-time inference on streaming data.

While the application describes specific examples, it is to be understood that the scope of the claims is not limited to these specific examples. Since other modifications and changes varied to fit particular operating requirements and environments will be apparent to those skilled in the art, the claims are not considered limited to the example chosen for purposes of disclosure and cover all changes and modifications which do not constitute departures from the true spirit and scope of the subject matter of this application.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method performed at a controller, comprising:
   receiving, at the controller, a deep learning model;
   determining, at the controller, a graph structure of the deep learning model received at the controller, wherein the graph structure includes neurons organized in layers, and the layers include:
   an input layer;
   a plurality of hidden layers comprising a first hidden layer and a second hidden layer;
   an output layer;
   obtaining, at the controller, topology data indicating a network topology of edge devices in a network, wherein the network includes:
   a first Internet Protocol (IP) subnetwork (subnet) including first IP addresses that are associated with first edge devices of the edge devices; and a second IP subnet including second IP addresses that are associated with second edge devices of the edge devices;

assigning, at the controller, a first portion of the first IP addresses of the first IP subnet to at least a part of the first hidden layer;

assigning, at the controller, a second portion of the second IP addresses of the second IP subnet to at least a part of the second hidden layer such that the first and second hidden layers at least partially execute in different subnets;

deploying the first portion of the first hidden layer to the first edge devices based at least in part on the first portion of the first hidden layer being assigned to the first portion of the first IP addresses, wherein the first edge devices collectively execute the first portion of the first hidden layer to perform first functionality of the first hidden layer; and deploying the second portion of the second hidden layer to the second edge devices based at least in part on the second portion of the second hidden layer being assigned to the second portion of the second IP addresses, wherein the second edge devices collectively execute the second portion of the second hidden layer to perform first functionality of the second hidden layer.

2. A method as claim 1 recites, further comprising creating a next-hop-routing sequence based on layer-to-layer communication in the graph structure of the deep learning model.

3. A method as claim 2 recites, further comprising extrapolating per-hop routing for individual neurons of the first hidden layer and second hidden layer.

4. A method as claim 1, wherein the first portion of the first hidden layer is executed in containerized applications on the first edge devices, further comprising deploying per-hop routing for individual neurons of the first hidden layer to individual containers of the containerized applications to control flow of data between layers of the graph structure.

5. A method as claim 1 recites, wherein the part of the first hidden layer is a first part, the method further comprising assigning a second part of the first hidden layer to a third IP subnet.

6. A method as claim 1 recites, wherein the part of the first hidden layer includes all of the first hidden layer.

7. A method as claim 1 recites, further comprising creating an IP routing topology based on the graph structure.

8. A method as claim 7 recites, wherein the IP routing topology bypasses a neuron having weight zero.

9. A method as claim 7 recites, further comprising modifying the IP routing topology based on resource availability on at least one of the edge devices.

10. A method as claim 1 recites, further comprising:
determining an amount of compute required to execute the deep learning model; and
determining that an available amount of compute availability of the first edge devices and the second edge devices is greater than the required amount of compute.

11. A method as claim 1 recites, further comprising:
identifying neurons of the first hidden layer; and
assigning individual ones of the neurons to an individual ones of the first IP addresses of the first IP subnet such that individual ones of the first edge devices execute individual ones of the neurons.

12. A system comprising:
one or more processors; and
one or more non-transitory computer-readable media storing computer-executable instructions that, when executed by the one or more processors, configure the one or more processors to:
receive a deep learning model;
determine a graph structure of the deep learning model, wherein the graph structure includes neurons organized in layers, and the layers include:
an input layer;
a plurality of hidden layers comprising a first hidden layer and a second hidden layer;
an output layer;
obtaining topology data indicating a network topology of edge devices in a network, wherein the network includes:
a first Internet Protocol (IP) subnetwork (subnet) including first IP addresses that are associated with first edge devices of the edge devices; and
a second IP subnet including second IP addresses that are associated with second edge devices of the edge devices;
assign to a first IP subnet, a first portion of the first IP addresses of the first IP subnet to at least a part of the first hidden layer;
assign to a second IP subnet, a second portion of the second IP addresses of the second IP subnet to at least a part of the second hidden layer such that the first and second hidden layers at least partially execute in different subnets;
deploy the first portion of the first hidden layer to the first edge devices based at least in part on the first portion of the first hidden layer being assigned to the first portion of the first IP addresses, wherein the first edge devices collectively execute the first portion of the first hidden layer to perform first functionality of the first hidden layer; and
deploy the second portion of the second hidden layer to the second edge devices based at least in part on the second portion of the second hidden layer being assigned to the second portion of the second IP addresses, wherein the second edge devices collectively execute the second portion of the second hidden layer to perform first functionality of the second hidden layer.

13. A system as claim 12 recites, the computer-executable instructions that, when executed by the one or more processors, further configure the one or more processors to create a next-hop-routing sequence based on layer-to-layer communication in the graph structure of the deep learning model.

14. A system as claim 12 recites, the computer-executable instructions that, when executed by the one or more processors, further configure the one or more processors to extrapolate per-hop routing for individual neurons of the first hidden layer and second hidden layer.

15. A system as claim 12 recites, wherein the first portion of the first hidden layer is executed in containerized applications on the first edge devices, the computer-executable instructions that, when executed by the one or more processors, further configure the one or more processors to deploy per-hop routing for individual neurons of the first hidden layer to individual containers of the containerized applications to control flow of data between layers of the graph structure.

16. A system as claim 12 recites, the computer-executable instructions that, when executed by the one or more processors, further configure the one or more processors to create an IP routing topology based on the graph structure.

17. A system as claim 16 recites, the computer-executable instructions that, when executed by the one or more processors, further configure the one or more processors to cause the IP routing topology to bypass a neuron having weight zero.

18. A system as claim 16 recites, the computer-executable instructions that, when executed by the one or more processors, further configure the one or more processors to modify the IP routing topology based on resource availability on at least one of the edge devices.

19. One or more non-transitory computer-readable media storing computer-executable instructions that, when executed by one or more processors, configure the one or more processors to perform operations that comprise to:
receive a deep learning model;
determine a graph structure of the deep learning model, wherein the graph structure includes neurons organized in layers, and the layers include:
an input layer;
a plurality of hidden layers comprising a first hidden layer and a second hidden layer;
an output layer;
obtaining topology data indicating a network topology of edge devices in a network, wherein the network includes:
a first Internet Protocol (IP) subnetwork (subnet) including first IP addresses that are associated with first edge devices of the edge devices; and
a second IP subnet including second IP addresses that are associated with second edge devices of the edge devices;
assign to a first IP subnet, a first portion of the first IP addresses of the first IP subnet to at least a part of the first hidden layer;
assign to a second IP subnet, a second portion of the second IP addresses of the second IP subnet to at least a part of the second hidden layer such that the first and second hidden layers at least partially execute in different subnets;
deploy the first portion of the first hidden layer to the first edge devices based at least in part on the first portion of the first hidden layer being assigned to the first portion of the first IP addresses, wherein the first edge devices collectively execute the first portion of the first hidden layer to perform first functionality of the first hidden layer; and
deploy the second portion of the second hidden layer to the second edge devices based at least in part on the second portion of the second hidden layer being assigned to the second portion of the second IP addresses, wherein the second edge devices collectively execute the second portion of the second hidden layer to perform first functionality of the second hidden layer.

20. One or more non-transitory computer-readable media as claim 19 recites, the computer-executable instructions that, when executed by one or more processors, configure the one or more processors to perform operations that further comprise:
to create an IP routing topology based on the graph structure; and
to modify the IP routing topology based on resource availability on at least one of the edge devices.

* * * * *